(12) United States Patent
Elassaad

(10) Patent No.: US 9,632,654 B1
(45) Date of Patent: Apr. 25, 2017

(54) SYSTEM AND METHOD FOR AUGMENTED KNOWLEDGE DISCOVERY

(71) Applicant: Shauki Elassaad, San Francisco, CA (US)

(72) Inventor: Shauki Elassaad, San Francisco, CA (US)

( * ) Notice: Subject to any disclaimer, the term of this patent is extended or adjusted under 35 U.S.C. 154(b) by 278 days.

(21) Appl. No.: 14/217,462

(22) Filed: Mar. 17, 2014

Related U.S. Application Data

(60) Provisional application No. 61/801,359, filed on Mar. 15, 2013.

(51) Int. Cl.
*G06F 17/30* (2006.01)
*G06F 3/0481* (2013.01)
*G06F 3/0484* (2013.01)

(52) U.S. Cl.
CPC ........ *G06F 3/0481* (2013.01); *G06F 3/04842* (2013.01); *G06F 17/30864* (2013.01)

(58) Field of Classification Search
CPC ..................... G06F 17/30864; G06F 17/30867
USPC .......................................................... 707/706
See application file for complete search history.

(56) References Cited

U.S. PATENT DOCUMENTS

| | | | | | |
|---|---|---|---|---|---|
| 5,713,960 | A * | 2/1998 | Christensen | ............ | A61L 27/16 523/113 |
| 6,231,613 | B1 * | 5/2001 | Greff | .............. | A61L 27/16 604/264 |
| 6,397,807 | B1 * | 6/2002 | Suzuki | ................. | F02M 31/163 123/142.5 R |
| 6,965,914 | B2 * | 11/2005 | Dowling | ................ | G06Q 20/32 705/34 |
| 7,373,336 | B2 * | 5/2008 | Jasinschi | ........... | G06F 17/30828 707/704 |
| 7,853,558 | B2 * | 12/2010 | Brindley | ........... | G06F 17/30038 707/608 |
| 8,166,189 | B1 * | 4/2012 | McGuire | ................ | G06Q 30/00 709/217 |
| 8,739,223 | B2 * | 5/2014 | Choi | .................. | H04N 21/4722 725/100 |
| 2003/0229629 | A1 * | 12/2003 | Jasinschi | ........... | G06F 17/30828 707/704 |
| 2009/0019039 | A1 * | 1/2009 | Brindley | ............ | G06Q 30/0241 707/723 |

(Continued)

*Primary Examiner* — Shahid Alam

(57) ABSTRACT

A system and method to present global and local context sensitive augmented content in accordance with multiple criteria, including one or more user's preferences, and present the augmented content via a transparent layer on top of the original content for less obtrusive and more efficient browsing, knowledge discovery and exploration experience. The original content remains visible to the user while the augmented content is being viewed or interacted with. The global context sensitive augmented content is generated using metrics based on the overall document or content being viewed, while the local context sensitive augmented content is generated using metrics based on the currently viewed or selected object within the document or content being viewed. Real-time and theme based augmentation are used to further enhance the user's experience. The local and global augmentation represent an in-situ user customized augmented network of concepts and relationships that are of interest to knowledge discovery of the topic at hand.

20 Claims, 5 Drawing Sheets

(56) References Cited

U.S. PATENT DOCUMENTS

| | | | | |
|---|---|---|---|---|
| 2011/0015996 A1* | 1/2011 | Kassoway | ......... | G06F 17/30882 705/14.49 |
| 2011/0320429 A1* | 12/2011 | Doig | ................ | G06F 17/30893 707/711 |
| 2012/0117485 A1* | 5/2012 | Brindley | ........... | G06F 17/30887 715/744 |

* cited by examiner

SYSTEM AND METHOD FOR AUGMENTED KNOWLEDGE DISCOVERY

PRIORITY CLAIM

This application claims priority to U.S. Provisional Patent Application entitled "Knowledge Discovery System", having application No. 61/801,359, filed Mar. 15, 2013, and is hereby incorporated by reference herein in its entirety.

TECHNICAL FIELD

The subject of this application generally relates to information retrieval and processing, knowledge discovery, and data presentation particularly to systems and methods for improving data-exploration, learning and browsing and, more specifically, to context sensitive data augmentation for a richer user experience (UX) in browsing, data-exploration, knowledge discovery, and learning systems.

BACKGROUND

Having a context sensitive user interface which can automatically choose from a multiplicity of options based on the current or previous state(s) of a program operation can be found in current graphical user interface. For example: Clicking on a text document automatically opens the document in a word processing environment. The user does not have to specify what type of program to use to open the file. Program files and their shortcuts (i.e. executable files) can be associated with certain type of files, e.g. text document, and are automatically run by the operating system when the user selects or double clicks the file. Similarly, the user-interface may also provide context sensitive feedback, such as changing the appearance and/or color of the mouse pointer or cursor. In addition, context sensitive feedback may also be used in video games where it change a button's function based on a player who is in a certain position or a place and needs to interact with an object.

Relational databases are currently the predominant choice in storing data like financial records, medical records, personal information, manufacturing and logistical data. Nowadays large-scale data or information processing can involve various types of collection, extraction, warehousing, analysis and statistics. For example, organizing and matching data by using some common characteristics found within the data set would result in new groups of data that can organized and are easier for many people to understand, search, index and manipulate.

By describing the contents and context of data files, the quality of processing the original data files can be greatly increased. For example, a webpage may include metadata specifying what language was used in writing its code, what tools were used to create it, and where to go for more on the subject, higher-level concepts that describe the data. Thus allowing browsers to automatically improve the experience of users. The results of any large-scale data processing can be an extensive set of meta-data, data, and relationships that may be used in a search engine, for example, to provide a possible set of related information to a term that is used in a search query. For example, search engines have used and generated enormous amount of data and metadata that is used to provide links to content that may be of possible interest to a user based on what the user is searching for.

As stored digital information has increased tremendously in size, the ability of a user to use effectively personal data, corporate data, or publically available data has also increased many folds although it still falls short of the potential of reasoning about the large amount of data that is available and continues to grow at an astounding pace. Therefore, there exists a need to more effectively use and reason about the data, and with more a richer augmented user experience while reading, writing, searching, or using digital data information.

SUMMARY

This disclosure presents new and useful methods and systems to provide multilevel context sensitive augmented experience, browsing, data exploration, knowledge discovery, and e-learning. In accordance with one embodiment, this multilevel context sensitive augmented content is presented using overlaid layers on top of the digital information (reference content or original content) being viewed by a user. Furthermore, the overlaid layers can be transparent or translucent for a non-obtrusive user experience. Thus, providing the user the ability to interact with the original content while viewing a dynamically updated augmented content on top of the original content, the updated augmented content is generated based at least on the user interaction with the reference content. Furthermore the user can manipulate the original content and its associated or related categories and other relevant augmentation data to generate more relevant and meaningful augmentation while viewing the augmented content on top of the reference content.

In accordance with one embodiment, a system for generating and presenting augmented content on a translucent display layer overlaid on top of a reference content display layer on the same display screen. The augmented content is generated using relevant features of the reference content or the displayed portion of the reference content. The generation of the augmented content is further customized using user-relevant characteristics, attributes, history, and relevant features in relation to the reference content such as generic categories and relationships. In addition, the user controls the position and size of both the reference content display layer and the augmented content display layers on the same display screen, as well as the ability of the user to control the visibility and hiding of all display layers. Furthermore, the user controls the sharing of the same display screen by the reference content and augmented content display layers.

In accordance with one embodiment, the system for generating and presenting augmented content provides a set of augmentation filters: topics and categories based on the reference content to aid the user in further customization of the augmentation filters to suite his/her interests. The generated augmentation content is one or more of online documents, web pages, web links. The generated augmentation content can be a customized version using a variety of ways such as presenting a summary of the augmented content, or in deleting un-necessary links and ads. In accordance with one embodiment, the generated augmentation content is based at least on one of (i) a set of criteria associated with the reference content, (ii) user customization of augmentation filters, (iii) user interaction with the reference content, and (iv) user interaction with the generated augmented content.

In accordance with one embodiment, the system can employ the same methods and algorithms to enable the user to custom build a knowledge graph of concepts and relationships based on information retrieved from structured and unstructured data residing in a private or public data store or other public repositories. The Augmentation System relies on these data sources along with the user's feedback and interests to generate on the fly relevant augmentation data for the task at hand. For example, a physician can utilize this system to custom build a knowledge graph for a patient based on the physician's experience and knowledge, the patient's history, the patient's known diseases, symptoms, and ailments, and known public data related to the patient's case. Such a system will enable the physician to make educated and informed decisions instead of being mired in a plethora of sources where it would be extremely hard for the physician to manually extract reliable and relevant data in an efficient and useful way.

In accordance with one embodiment, the system for generating and presenting augmented content dynamically updates the augmented content by utilizing additional filters, metrics, and customization provided by the user as a result of the generated augmented content. Furthermore, the user can save any or all the data associated with a particular session of data augmentation. This will enable the user to build on the augmentation of previous sessions.

In accordance with one embodiment, the system for generating and presenting augmented content generates global and local augmentation content associated with the reference content and any selected or highlighted part of it. For example, the system generates a plurality of global augmentation content based on the augmentation filters associated with the overall reference content, and the system generates a plurality of local augmentation content based on a specific part of the reference content that is selected or flagged by the user, or currently being viewed by the user.

In accordance with one embodiment, the system for generating and presenting augmented content enables collaborative augmentation, e.g. a user can share the generated augmented content with other users. Furthermore, the user can share the content augmentation filters or the settings used to generate the augmented content with other users.

In accordance with one embodiment, the system for generating and presenting augmented content enables a user to make use of nested hierarchical content augmentation capabilities. A user can request content augmentation using at least a portion of a previously generated augmented content. The previously generated augmented content serves as new reference content for the system to generate and present to the user a new augmented content. The user can traverse the content augmentation graph to further customize the content augmentation at any level.

In accordance with one embodiment, the display screen may be physically attached to an electronic device, e.g. a mobile device, a handheld device, a tablet, etc. . . . , or the display screen may physically separate from the electronic device. For example a touch display where a user interacts with the display screen and controls both the position and size of the various display layers on the display screen. The display screen can communicate with a remote electronic device such as a remote server, or a mobile device. Alternately, the user can control the position and size of all display layers on the physically detached display screen using the electronic device.

In accordance with one embodiment, the user interaction with the reference content includes at least one of a manipulation of a region of the first display layer, a manipulation of a region of the second display layer, hiding of the first display layer, hiding of the second display layer, saving the first set of augmented content, saving a portion of the first set of augmented content, modifying the translucency of the second display layer, a selection of a region of the first display screen, a manipulation of a region of the first display screen, one or more user gesture made onto the first display screen, an activation of a button of the first display screen, an activation of a button of the electronic device, and using a human interface device to communicate the user interaction to the electronic device.

In accordance with one embodiment, the reference content, local content, augmentation content are displayed using multiple display layers by means of one or more display screens. The display screen comprises electronic system to receive and/or transmit information to an electronic device. The user interaction with the reference content includes the manipulation of one or more regions of at least one display layer, a manipulation of one or more regions of at least one display layer of the augmented content, hiding of any one or more of the display layers, saving the first set of augmented content, saving a portion of the first set of augmented content, modifying the translucency of any one of the display layers, a selection or a manipulation of one or more regions of any one of the display screens, one or more user gesture made onto the display screen, an activation of a button of the display screen, an activation of a button of the electronic device, and using a human interface device to communicate the user interaction to the electronic device or to the display screen.

In accordance with one embodiment, this disclosure refers to augmenting a given content based on a number of manually defined and automatically extracted parameters to generate a set of local and global data elements. The set of local and global data elements can be used in a variety of application specific augmentation systems to enhance a user's experience while interacting with the given content.

In accordance with one embodiment, this disclosure facilitates the construction and presentation of a user-customized network of concepts, objects and relationships that serve to augment the content at hand for the purpose of knowledge discovery, learning, and a richer user experience in browsing and/or interacting with data information. Furthermore, the constructed network can be saved and further augmented over time for richer and more efficient user experience. This is in contrast to having a pre-built network of concepts and relationships that a user can access. This system generates a network that can be customized and tailored based on the user's interests.

In accordance with one embodiment, this disclosure facilitates a system that provides the user the ability to fully control the generated augmented content by virtue of changing the scope of certain topics, e.g. expanding or specifying a narrower sub-topic, based at least on one of a defined theme, predefined themes, and categories. Therefore, the augmented content can serve to further explain, define, and to elaborate and expound on reference content or a selected portion of reference content being viewed, observed, or interacted with by a user.

In accordance with one embodiment, this disclosure can be used to aggregate information related to a reference or selected content by customizing the augmentation filters to achieve the desired or intended results. For example, the information, reference content, or the generated augmented content can include rich media like video, audio, images as well as text. Various filters can be customized by the user to enable a user to increase the relevance of the generated augmented content to the intended user objective. In addition, a hierarchical system of content augmentation may be defined and customized by a selected theme or a category. The generated augmented content and its display layers can be monetized for ads and other monetization purposes.

In accordance with one embodiment, this disclosure enables real-time manipulation of reference and augmented content for enhanced and richer User Experience (UX). In addition, collaboration and sharing of augmented content provides an increase in value and productivity to a user. Similarly, collaboration and sharing of augmentations filters and settings provide additional richness and ease of viewing, browsing, sharing, and manipulation of reference and augmented content. Furthermore, the user is able to control the presentation style of the generated augmented content, e.g. as raw links, concise summary of augmented content, or other methods that capture the essence of the augmented content. The presentation style of the generated augmented content may be for data analysis, research, information, monetization, commercial, or educational purposes.

DETAILED DESCRIPTION

Figure 1:
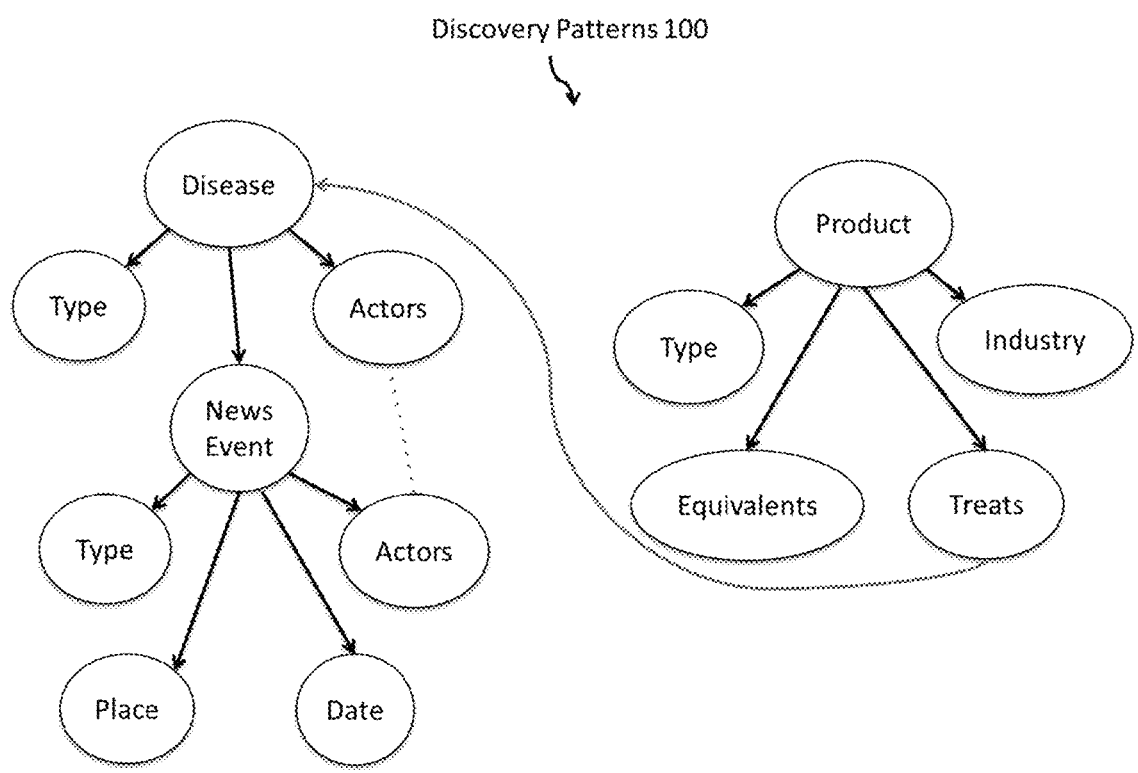
FIG. 1 shows Discovery Patterns.

The present disclosure presents techniques, systems and methods to provide a user with global and local context sensitive augmented content to enhance the user experience while interacting with digital information be it while reading, writing, drawing, browsing, searching, viewing, or using digital data information such as financial, medical, business or corporate data, social media data, or any data that is accessible locally or on the web and/or remotely through web based services. These techniques, systems and methods are applicable to various computing platforms such as hand-held devices, desktop computers, notebook computers, mobile devices, as well as compute servers.

The term "coupled" is defined as connected, although not necessarily directly, and not necessarily mechanically. The terms "a" and "an" are defined as one or more unless this disclosure explicitly requires otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

In general, various information processing techniques and algorithms can be used to provide the augmented data system with global and local context sensitive augmented content. In the following paragraphs certain definitions and representations of data flow models are presented and discussed without limitations on how each model may be implemented whether by hardware, software, firmware, or any combination thereof.

Multilevel, e.g. global and local, context sensitive augmented content would increase productivity and enhance a user's experience while viewing or interacting with data for the purpose of learning, reading, writing, drawing, browsing, searching, discovering, viewing images or any type of user interaction with digital data information whether structured or unstructured (e.g. financial, health, manufacturing, and corporate data). The digital data information may be stored locally or remotely via a corporate server or in the cloud. Additionally private as well as public sources of data may be used or selected by the user for the ultimate personalized range of choices that may be used to further narrow down or expand the augmented content being presented.

Additionally, multilevel context sensitive augmented content would increase productivity and enhance business intelligence for the enterprise by providing context sensitive augmented content that is generated by dynamically mining and analyzing structured and unstructured enterprise data and/or possibly leveraging structured and unstructured publically available data for further improving user experience. In addition, multilevel context sensitive content augmentation filters provide the ability to dynamically mine data on the fly based on modification of a new input from a user. For example, a new input from a user can be the selection of a new text or a portion of the reference content, or it can be a feedback provided such as elevating the priority or weight (e.g. like) or decreasing the priority or weight (e.g. dislike, delete, dismiss) a single augmented content, a category of augmented content, or a theme of augmented content. Furthermore, leveraging the history and/or user personal preferences, the multilevel context sensitive augmented content can be further in tune with what the user would like to see or expects to see in the augmented content being generated and presented.

In accordance with one embodiment, a feature of the multilevel context sensitive augmented content is that the augmented content is generated either in the cloud or locally using sophisticated information retrieval algorithms or using a set of heuristics so as to enable large-scale data processing, information retrieval, and web mining. Knowing that extracting a feature set from a web page is a problem that is known and various algorithms, methods, and research into various solutions have been made, this system can use existing research or methodologies to extract a feature set. Furthermore, this system employs a set of heuristics and metrics that efficiently extract a set of features that characterize the reference content at hand. These heuristics rely on embedded hints, metrics, meta-data, or other embedded knowledge and information that can be extracted from the structure, url link, embedded links, title of the document, or other types of data that may be directly or indirectly related to the reference content along with feedback provided by the user.

In accordance with one embodiment, a feature of the multilevel context sensitive augmented content is that the information retrieved and knowledge constructed can be saved and called upon in future augmentation tasks and sessions.

In accordance with one embodiment, a feature of the multilevel context sensitive augmented content is that the augmented content is presented through a translucent layer on top of the original content being viewed by the user. Hence a non-obtrusive content augmentation that is hidden or made available whenever a user disables or enables the global and local context sensitive augmented content application. Relevant augmented content are displayed on top of a translucent layer on top of the original content being viewed by the user. Hence, the augmentation system provides a less obtrusive and more efficient interaction, browsing and exploration experience.

In accordance with one embodiment, a multilevel corresponds to at least two levels, a global level and a local level. A global and a local relevant features of reference content, may be defined as a global relevant feature corresponding to a feature or a theme common throughout the reference content, and a local relevant feature corresponding to a feature strongly related to a locality within the reference content. One method of dynamically updating augmented content can be achieved by leveraging real-time user feedback, such as elevating priority or dismissing augmented content as being presented to the user. If an augmented content's priority is elevated, its weight increases as well as the metadata that describes this augmented content gets promoted which in turn updates existing augmentation filters as well as generating and presenting new augmentation content based on the new metrics. For example, if an augmented content describing certain public policy information is promoted, then that augmented content's priority is increased, and the priorities of all augmented content that reference some public policy, or government policy get increased. In addition, the augmented content can be dynamically updated based on user interaction, e.g. selection and/or clicking, within the reference or augmented content in real time. There are various means to implement the augmented content presentation layers such as dials for global and local augmented content, or a scroll-area of small windows for various augmented content. Describing all these various means to implement the augmented content presentation layer is not necessary to understand this disclosure. Furthermore, a person skilled in the art would understand and would be able to employ many different means to implement augmented content presentation layers without departing from the spirit of this disclosure.

In accordance with one embodiment, while generating augmented content may result in a lot of data that cannot be shown on the display, this data can be stored in a deep queue. A deep queue means that there is more augmented content (data) in the queue than what is displayed on the screen. For example, not all mined augmented content can be displayed simultaneously due to physical screen size limitations or the display layer size. A user can hover over the queue or press an arrow to scroll through the augmented content in the queue. In addition, it is important to note that the augmented content being presented to the user may comprise actual data, snap shot of the actual data, a processed portion of the actual data, or a link to the location where the actual data can be retrieved.

Theme-based augmented content can further enhance a user's experience by presenting a set of themes. In accordance with one embodiment, when the user selects or deselects a theme, a new or updated augmented content is presented to the user. An option to expedite augmentation and improve the quality is to rely on the user's preferences and feedback. When the application is invoked, a set of categories/themes can be presented to the user. These constitute meta-data. By relying on the user choices of themes, augmentation can be enhanced and filtered. For example, a research paper that deals with AIDS virus would trigger a set of themes such as Pharmaceuticals; Discrimination, etc. . . . . The user who is interested in science and pharmacology but not in the social aspects related to AIDS would deselect 'Discrimination'. Thus, all augmented content presented will be tailored to refer to categories that are related to science and other related aspects of the research. The theme can further be defined by a category or a set of related categories. This will serve to prune the augmented data and only present the relevant data that is of interest to the user and the task he is carrying out at that moment.

Multilevel context sensitive augmented content application can be implemented as a stand-alone application, on top of another application, or as an extension for applications, e.g. a browser extension. In accordance with one embodiment, further refinement or fine tuning of various options for customization of augmentation system such as aggregating, mining, filtering, and presenting various aspect of data or metadata can be performed dynamically in real-time. In addition, the customization of augmentation system may be performed based on at least one or more of a user's feedback, behavior, attributes, characteristics, theme, topics, and interests. Also when augmentation system presents a list of tags/categories, the user can provide feedback in the form or liking/disliking the tag. This is similar to promoting or dismissing an augmented content. Therefore, in accordance with one embodiment, the augmented content can be updated live. Furthermore, this user's feedback would also result in updating various subsystems such as the underlying data-mining, statistical computing algorithms, or machine-learning algorithms or other information retrieval algorithms or heuristics. These updated subsystems are used to generate or create new signatures, metrics, or features which are based on user's feedback, e.g. liked/disliked tags, where the new signatures are used to generate new augmented content or update the currently presented augmented content.

In accordance with one embodiment, a feature of a system for generating and presenting multilevel context sensitive augmented content is the ability to utilize online and offline mining and analytics for augmentation. For example, mining and processing in real-time or in batch mode and store data in a data store (local or remote) or presenting real-time augmented content to the user. The stored data can be used for future augmentation. Metadata and other relevant data elements can also be annotated in real-time to capture user's preferences and experiences. In addition, metadata and other relevant data elements can be stored in a central repository to be leveraged for future augmentation of same or similar content. A brief description of metadata is that it is data that describes other data. For example: 'public health' is a category that encompasses diseases. This higher level category 'public health' is a metadata for diseases.

In accordance with one embodiment, a multilevel context sensitive augmented content system uses at least two levels, a global level and a local level. The following explains the difference between global and local augmented content. Global augmented content refers to augmented data that pertain to the overall document that the user is currently browsing, exploring, or interacting with. A local augmented content can refer to augmented content based on a particular piece, paragraph, sentence, word, image, icon, symbol, etc. . . . of that document that the user is currently browsing, exploring, or interacting with. Global & local augmented content are presented using a dynamic deep queue, and the user can control the displaying of at least a portion of the augmented content. Content sources for augmentation can be provided from many sources. An example of such content sources includes but is not limited to a user's own documents and data on desktop, web-content, social media sites, enterprise data-marts, and local and remote data stores, ontologies, other categorization, and/or semantic or relationship graphs.

The multilevel context sensitive augmented content can be successfully implemented to augment a user's browsing experience as discussed above. In accordance with one embodiment, a system for generating and presenting multilevel context sensitive augmented content can be successfully implemented as an application for augmented user experience (UX). The system can increase productivity, provides augmented data-mining & data-exploration platform, augmented e-learning and e-research system, augmented desktop-based & mobile-based browsing, exploration, research, discovery, and learning platforms, data augmentation for better healthcare products and services, data augmentation for better educational products and services, augmentation system for better content management and relationship platform for both enterprise and consumer applications, enhanced online-shopping research and UX, enhanced marketing campaigns, an enhanced news access UX are but to name a few of application benefiting from a system for generating and presenting multilevel context sensitive augmented content.

Semantic processing is the process of reasoning about the underlying concepts and expressing their relationships. In addition to various augmentation methods as described above, the following semantic based techniques can also be used in a system for generating and presenting augmented content. In accordance with one embodiment, utilizing existing tags in public sources, utilizing batch-processed tags as a cloud application, semantic processing of selected content to generate a match to an existing tag, semantic processing to generate augmented content on the fly and utilizing user's feedback for promoting and dismissing augmented content are but examples for methods to provide a better user-relevant augmented content. Generating augmented content on the fly can also be accomplished by using a feedback mechanism provided by the user to enable mining and generating of new augmented data to be presented to the user.

In accordance with one embodiment, a system for generating and presenting multilevel context sensitive augmented content is used to improve the analytics of large data sets by leveraging pre-processed data and already generated relationships. Given a content that is the result of a statistical data mining and exploration phase on a small or large amounts data—be it remote or local—extract the correlation metrics and other signatures that demonstrate a meta-relationship and leverage it in other data-mining, analytics, and to generate augmented content. For example: When a user presents some key words to a search engine, the user gets a set of links that are related in addition to some ads that could very well be related to the key words you have entered or to some personal data known or extracted of the user. These presented links and ads have gone through a huge amount of processing and computation in the cloud. By knowing that a relationship or a meta-relationship exists between the keywords, links, and may be other content pushed to the user like ads, the analytics operation can leverage them and extract, store, and leverage these signatures for future browsing or for presenting context sensitive augmented content.

In accordance with one embodiment, the content presented to the search engine can be either parsed from the html or other format or interface produced by a data provider. Or, it can be scanned through OCR if the data format is encrypted. This ability to take a snap shot of a screen and analyzes and leverages its data and relationships empowers and simplifies the augmentation and analytics processes and improves the throughput since the signatures/correlation metrics extracted are a result of processing a significantly smaller set of data. Therefore, the performance gain of a system for generating and presenting multilevel context sensitive augmented content is orders of magnitude compared to mining massive data sets in the cloud.

In accordance with one embodiment, a system for generating and presenting multilevel context sensitive augmented content presents the augmented content along with the reference content using two or more different presentation layers displayed using the same display screen. In addition, the system provides the ability to customize the generation of augmented data in situ (in place) while working on original or reference content, where the augmented data can be displayed on see thru presentation layers so as not to obscure the original or reference content and to maximize use of the display screen, and/or the displaying area.

In accordance with one embodiment, a system for generating and presenting multilevel context sensitive augmented content utilizes dynamic updates of displayed augmented content using presentation layers while a user views and manipulates reference content displayed using another presentation layer. It is preferable to use a translucent presentation layer for the augmented content presentation layer that is located on top of the displayed reference content so that the user can easily manipulate or interact with the reference content while simultaneously viewing the dynamically updated augmented content. As can be easily appreciated by person skilled in the art that displaying relevant augmented data in a separate tab or page would result in loss of context relationship and provides a less efficient and less friendly user experience. Similarly, displaying the augmented content on the sidebars is possible as well. However it consumes screen space and hinders displaying of the reference content. Therefore, the ability to keep the reference content accessible to the user while displaying the augmented data on top of the original content provides a much smoother and efficient user experience. Furthermore, the user can easily hide, size, move, or display the augmented content without affecting the reference content.

In accordance with one embodiment, a system for generating and presenting multilevel context sensitive augmented content enables a user the ability to associate any of the augmented content with the reference content or an attribute of the reference content source using one or more types of metadata. The system enables the user to save the associated metadata for future use or sessions. For example, the association of metadata can be accomplished by embedding a link in the text, by associating a link with a text, or by associating any data or metadata with the reference content or any part of the reference content. Moreover, the user has the ability to specify a category or more as a source or criterion of augmentation. The user can also define association rules that join a group of attributes, categories, and other metrics together to provide a richer input to aid the augmentation system to generate more relevant augmentation content. For example, an enterprise sales projection document can always be augmented with any data source or data documents that generated the projection. The criterion is a category that says source sales data and not necessarily the exact data documents. The sales data can be extracted automatically by the augmentation system. Utilizing selected or provided categories of interest, the augmentation system can carry out an updating procedure for any associated data or metadata for any other reference content. Furthermore, the augmented content is displayed using see-through layers so that the user always sees and has access to the original or reference content. The user is able to access, browse, move, select, hide, tap, scroll, or interact with the reference or augmented content while the system dynamically generates and displays an updated augmented content using the augmentation presentation layer. It is noted that the user interaction with the reference or augmented content can result in having a new reference content that the user wishes to interact with, hence, a new augmented content is generated and displayed. The system keeps track of and saves certain information regarding this nested augmentation level. The system provides the user the ability to switch back and forth between various nested augmentation levels as well as saving or sharing the augmentation filters or settings used for a particular session.

In accordance with one embodiment, further enhancement of the user experience is achieved by enabling the user to change the skin (or look of a user interface UI) of the augmentation system. For example, the same components of a UI (buttons, options, data) can be displayed on the screen in a variety of ways. Usually, a library of templates and color options can be provided to allow the user to customize the augmented content presented by the application. In addition, the global augmented content and local augmented content can be displayed using one or more different regions of the screen, or displaying the global and local links to the augmented content in two concentric circles around the reference content. The enhancement of the user experience is achieved by enabling the user to choose the most efficient way for that user to utilize the augmented content.

In accordance with one embodiment, user selectable skins can also be used to cover or hide pushed content that may exist or embedded in the reference content being viewed. User selectable areas of a skin can be used to enable the display of user selected content such as images or augmented content, or pushed content such as advertisement. For example, an ad for tickets to a local concert when the user is browsing a specific artist, or an ad for a book that relates to a global or local augmented content of the user reference or currently viewed augmented content, or any other monetization mechanism based on the augmentation process. The enhancement of the user experience includes a nested multilevel context sensitive augmented content where the augmented content presented to the user can be further enhanced as a function of the various nested levels. The augmented content is presented while keeping track of the current content being viewed in relationship to the original content that the user started with and all levels in between. This provides a hierarchical augmentation system that enables the user to access and build nested levels of augmentation.

In accordance with one embodiment, the user interface, or UI, for a system for generating and presenting multilevel context sensitive augmented content can be launched or started automatically and stays hidden from view until the user invoke a predefined programming function to enable the UI functionality. For example, a single tap, hot-key, function-key, a gesture, or a multiple or a combination of actions acted upon a content would cause the transparent augmentation layer to be shown with the augmented content and in accordance with user preferences, such as tags, skins, themes, etc. . . . . Selecting content presents or updates the augmented content already presented. Visiting an augmentation link results in completely or partially (split screen) covering the reference content or original layer comprising the original content. The UI provides the user the ability to navigate nested augmented content or jump back to reference or original content.

In accordance with one embodiment, additional UI features can further be used to increase the overall efficiency and provide a better user experience. For example, saving the augmented content metrics in user history, and using history to enhance and/or tailor analytics and augmentation as would be more relevant to each individual user or group of users such as in corporate environment. Metrics here refer to the generated signatures as mentioned above. Also, it refers to any annotations that are provided by the user such as priority, liking/promoting an augmented content or dismissing it. This can be stored for future sessions as well as using the augmented content promotion and dismissal to enhance augmentation in real time. Using skins that cover an undesirable part of the screen, e.g. side columns where ads are pushed. The skin may be used for further customization of the viewed screen and potentially could be monetized and leveraged to present relevant augmented content that is paid for by the user, such as ads for objects, e.g. books, related to the content of a reference article.

In accordance with one embodiment, a system for generating and presenting multilevel context sensitive augmented content provides dynamic user-guided and customized context-sensitive data augmentation to facilitate learning, exploration and knowledge discovery. The system provides simultaneous interaction with the augmentation layer and the content layer. The system generates augmentation data based on user-defined metrics and filters such as themes, categories of interest, document content and/or part of it. The generated data is not a rigid augmented content. The generated augmented content is any data, concept, and relationships that are presented as a result of the data mining and processing of the original content and the user-defined metrics and filters.

In accordance with one embodiment, the system utilizes dynamic and interactive methods to successively refine and tailor the augmented content based on a user's guidelines, filters, and metrics. The system relies on a variety of sources for content augmentation by accessing any online or offline databases, crowd-sourced databases, or open databases. Furthermore, over time, a custom built graph of concepts and relationships can be built between different pieces of data as they are processed and augmented based on the user's filters and metrics to improve the performance of the system and the User Experience. The system provides a context-sensitive hierarchical augmentation framework for deeper and expansive exploration and knowledge discovery. The system enables construction of a customized graph of data, concepts, and relationships based on the filters and metrics provided even in the absence of content. Content can be generated on the fly for further exploration.

In accordance with one embodiment, the system enables sharing of augmented data and the associated metrics that generated them. This enables richer knowledge discovery by further refining a user's augmented data based on other users' augmented content. This is useful for collaborative research and knowledge discovery. The system can be launched from offline and online documents or reference content to generate the augmentation content, data and graph of relationships amongst the concepts represented by the augmented content.

In accordance with one embodiment, the system provides a UI to display and manipulate reference content and augmented content concurrently, dynamically, and interactively. The system provides one ore more translucent layers on top of the reference content to show the augmented content. Translucent layers facilitate displaying the reference content as well as the augmented content. Translucent layers can fully or partially cover the original content. Augmentation layers can be hidden, minimized ((shown as icon), or moved around on the display screen to facilitate easier display and interaction with the reference content. The system enables the user to manipulate and control a set of display layers (reference content layer, and/or augmentation display layers) in a very flexible fashion such that the user can size up, down, move, show, hide any of those display layers. The system provides an intuitive, rich, and friendly UX for data exploration and knowledge discovery on small and large display screens. In particular, displaying of the augmented content concurrently and interactively on the original content empowers the user to use this system on smart phones, tablets, and any other display. Furthermore, the system provides means to insert additional content on the augmentation layers based on analytics on the augmented content and the original content.

Knowledge discovery system serves to augment, clarify, enrich, and expand on a relevant topic or topics in a document. A number of information processing techniques is carried out to disambiguate information and extract names, concepts, events, and other relevant meta-data using Name-Entity-Recognition (NER), topic modeling to discover topics related to the reference document. Such topics can be either explicitly mentioned or discovered by relying on techniques based on information processing, data mining, machine learning to process discovery patterns, and causality graph and other web and data repositories.

Name Entity Resolution/Recognition (NER) processes the document, disambiguates names and concepts, extracts names, concepts, dates, name phrases, and any other data that can be parsed, processed, or inferred. Use of latest information extraction, data mining and natural processing are some of the techniques and algorithms that can be used in this step.

Topic Modeling and Topic Graph: Mine data from stored knowledge graphs, causality graphs, or other repositories to extract and cluster topics and categories from the mined names, concepts, and other processed data. Latest research in data clustering, topic extraction, inference, modeling, and latent topic discovery can be used to build a topic graph. A topic and clusters are interchangeable in this graph. A cluster is a set of related data that share a set of common features and relationships. One of those features or relationships can be a theme. A topic is a cluster of documents that share a common theme. Not all relevant topics can be discovered by the topic extraction step. More topics (relevant and possible hidden) can be extracted by the aid of the discovery patterns and causality graphs below.

Hierarchical Graph Discovery of intermediate topics and themes to discover/expose relationship between related topics and clusters. This graph can be a pre-defined taxonomy, or a hierarchically constructed graph based on different levels of coarse and fine clusters constructed based on the available content.

Data Clustering is the process of constructing a set of clusters of related documents. The relatedness is defined based on a set of desired features and/or relationships. Topic Modeling above is a form of data clusters where each topic is a cluster that shares a common theme.

Discovery Patterns (DP) 100 are templates that aid the discovery system to extract the relevant knowledge for a topic or a concept, as shown in FIG. 1. For example, for a topic, it will query for the relevant properties or relationships that are annotated on the topic or its meta-topic. Furthermore, a DP can help in defining a set of competency questions that will be very important to data augmentation and knowledge discovery. DPs define and a set of Competency Questions (CQ) that can be extracted from the data/content to extract and discover salient content and relationships. These discovery patterns can be pre-defined, manually constructed, extracted from other data sites or repositories, or crafted on the fly. They can also be further enhanced and massaged as the system gathers more data. Also, they can be tailored based on user's specific features and interests.

Competency Questions (CQ) define a set of queries that are very specific to the content at hand. These queries enable very focused knowledge discovery. These CQs are domain dependent. For example the set of CQs for knowledge discovery of legal corpus is different from the set of CQs for knowledge discovery of medical corpus. Our system in addition to leveraging pre-defined CQs modeled in pre-defined DPs, it enables the user to provide a custom-defined DPs their associated CQs, and also automatically infer a set of CQs and dynamically construct a set of DPs based on the available content and features.

Ontologies and public repositories provide pre-defined sets of concepts and relationships that can be leveraged in the knowledge discovery process. Wikipedia, Wordnet, Freebase, Verbnet are examples of such repositories that are rich, and constantly updated. Although these ontologies and repositories are bulky, they are rich with relevant content. Our system leverages these repositories amongst others sources to discover rich augmentation content.

Causality graph (CG) enriches and enhances the knowledge discovery phase. By minding known data (world wide web documents), accessible repositories (public and possible private), a large body of knowledge can be modeled. CG serves to build the set of relationship that exist between the topics can be extracted and modeled in the CG. Also, causality and dates of events can be extracted and inferred and modeled in the CG. These will serve in discovering more hidden but important topics and relationships that should exist in the topic graph but they have not been discovered yet.

Abstracted Causality Graph is a graph that is constructed from the causality graph (CG), the CG should be abstracted so that similar topics, relationships, cause and effects, and their meta-subjects are captured. This will aid in leveraging all this knowledge to augment and enrich new information and knowledge. This is essential for knowledge discovery. An example of abstracted concepts could be if company X acquires company Y, it is not important who X and Y are, but what is very important is the notion that a company can acquire another company. This way when we see a name of company in a new document, we can automatically ask the question about any prior or expected acquisition for the company at hand.

Data Augmentation as was discussed in a previous disclosure refers to local and global data augmentation and knowledge that are extracted and presented to the user to further expand on the document at hand. This data is based on all the knowledge modeled in the discovery graph (topics, clusters, and relationships), causality graph, discovery patterns library, and other on the fly information extraction. This augmentation will facilitate Timeline Events related to both local and global augmentation data and will provide a rich knowledge discovery experience. The user can browse in time to discover relevant knowledge about the topic or topics at hand.

Figure 2:
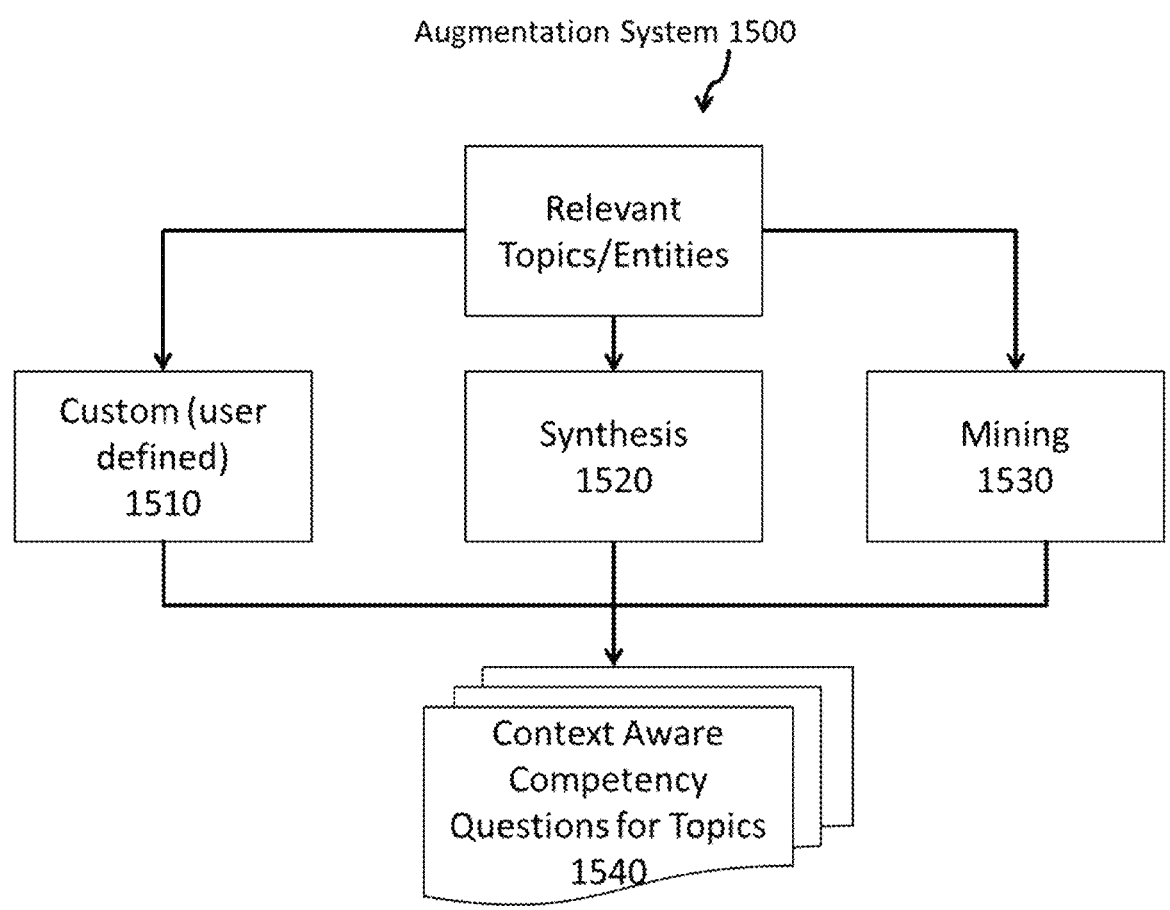
FIG. 2 shows block diagram for an Augmentation System.

A block diagram for an Augmentation System 1500 is shown in FIG. 2. The goal of this system is to read, synthesize, and/or extract a set of competency questions that will enable smarter content discovery and augmentation. Competency Questions (CQ) is a set of queries that are very specific, well defined, and rich features that guide the knowledge discovery process. Box 1510 reads and processes a set of 'competency questions' from the user, Box 1520 synthesizes those CQs based on an automated template generation that will define and fill the relevant competency questions for the content at hand. Synthesis based on extracted relationships of topics in CG, topical graphs, or other synthesized relationships. Box 1530 extracts those CQ based on content discovered by processing those relevant topics and entities. Box 1540 compiles and outputs the constructed set of CQs as produced by any or all boxes 1510, 1520, and 1530.

Figure 3:
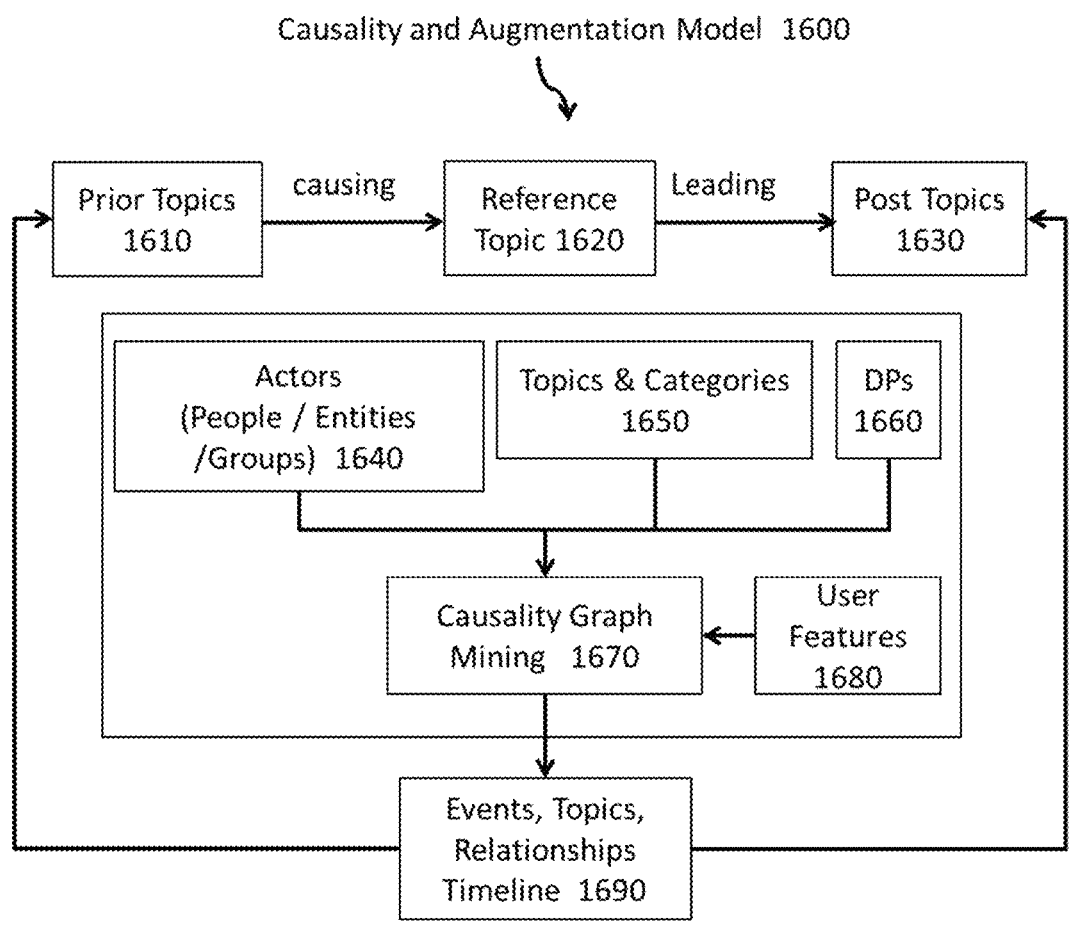
FIG. 3 shows block diagram for Causality and Augmentation System.

A block diagram for Causality and Augmentation System 1600 is shown in FIG. 3. The goal of this system is to construct a causality graph that captures the cause-effect between different mined or discovered topics in the system. This causality relationship extraction adds another dimension to the knowledge discovery system. Box 1610 defines a set of prior topics that are relevant to content. Box 1620 defines a reference topic to be augmented. Box 1630 defines a set of topics that are caused by the prior topics and related to the current reference topic. Box 1640 defines the set of actors that are at play in the causal relationships. These actors can be named entities such (person, location, organizations, groups). Box 1650 defines a set of topics and their related categories so that the correct causal relationship is used should there be more than one relationship. Box 1660 a set of Discovery Patterns (DP) that will enable the system to extract the right meta data and annotations when discovering the causal relationships. Box 1680 defines a set of user-provided features that will aid in this discovery process. Box 1670 defines that causality graph that is the result of processing all the input defined in the previous mentioned boxes. Box 1690 is the set of causal relationships and relevant content to be added to the augmented content.

Figure 4:
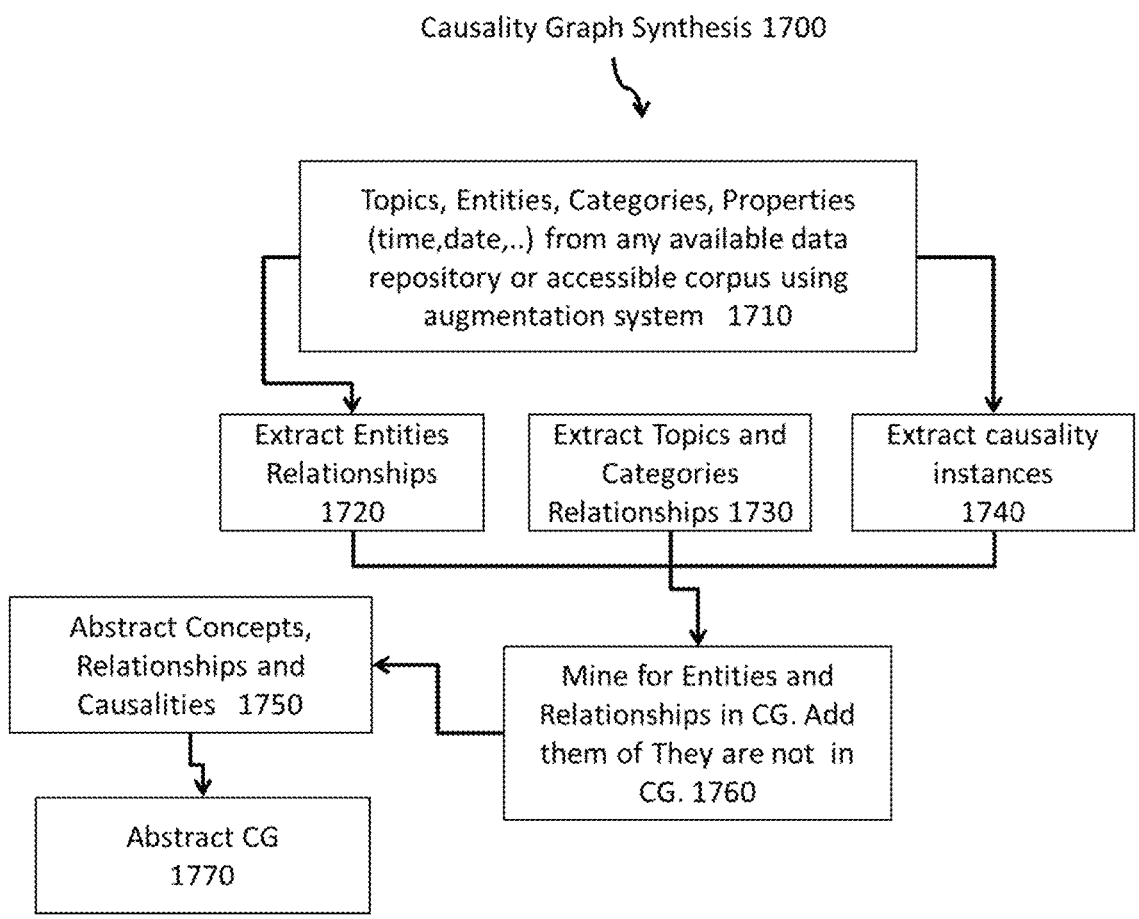
FIG. 4 shows block diagram of a Causality Graph Synthesis.

A block diagram of a Causality Graph Synthesis 1700 is shown in FIG. 4. The goal of this system is to build and abstract the causality graph such that it is applicable to a different set of actors and entities that share the same set of relationships defined in the graph. Box 1710 defines a set of topics and relevant content that can be mined form any source public or private. These constitute the nodes in the causality graph. This system builds and infers edges between those nodes based on a set of rules, heuristics, discovered relationships, or pre-defined relationships. Box 1720 extracts relationships between the presented entities. Box 1730 extracts relationships between the presented topics and their corresponding categories, and Box 1740 extracts instances of causalities based on the presented content itself. Box 1760 checks the existing causality graph for the discovered or inferred edges. If they are not present already, they are added to the causality graph (CG). Box 1750 processes the updated causality graph (CG) and infers abstracted relationships and adds it to the graph so that the CG becomes more abstract and applicable to future instances of relevant topics and entities. Box 1770 is the output of this system that presents a rich and abstract causality graph.

Figure 5:
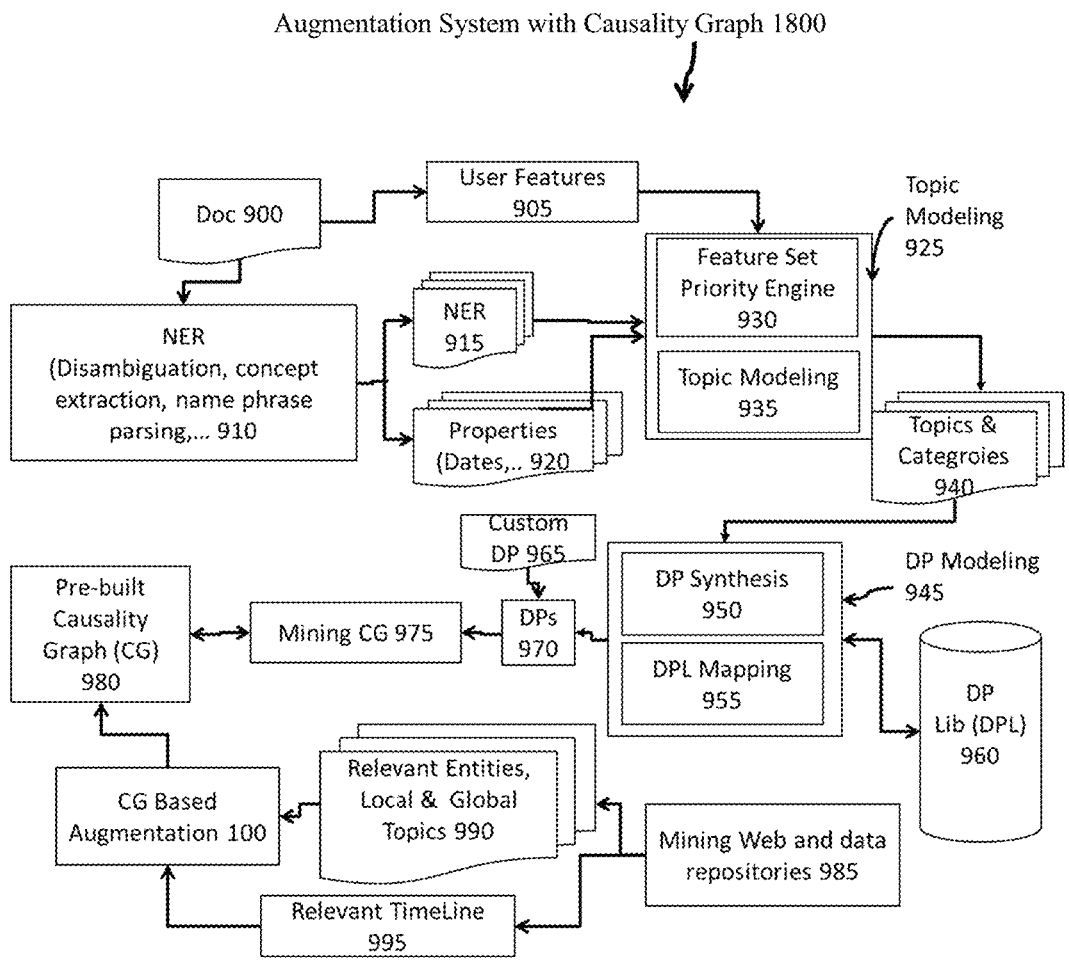
FIG. 5 shows block diagram of the Augmentation System with the causality graph.

A block diagram of the Augmentation System with the causality graph 1800 is shown in FIG. 5. This block diagram shows an overview of the whole augmentation system operation. Block 900 shows the document that needs to be augmented. Box 905 shows the features that were extracted from this document as signatures to aid in finding relevant augmentation. Box 910 defines the named-entity-recognition system what extracts the salient entities in the system. Box 915 presents the set of entities extracted. Box 920 presents other features or properties such as dates or others that will further aid in augmentation. Box 930 shows a ranking engine for the features presented so that noisy or less salient features are pruned out to further aid in higher quality augmentation content. Clustering and Topic modeling is executed on this relevant content in Box 935. Box 940 presents the set of relevant clusters and topics that are constructed. Leveraging a library of pre-defined (Box 960), dynamically synthesized (Box 950, Box 955), or user-provided (Box 965) discovery patterns carry out further content augmentation. Box 955 defines a mapping between a discovery pattern in the library and a synthesized relationship based on the presented features. Box 970 presents the resultant set of discovery patterns. Box 975 processes those patterns by examining the causality graph (CG) to see if such relationships exist or are defined. Further augmentation content can be added to the causality graph by processing relevant documents in public or private repositories (Box 985). Box 990 presents a new set of entities and topics from the freshly mined content. Box 995 extracts a timeline from the freshly mined content so that the right part of the causality graph is updated. This data is further used to extract a relevant timeline to process the dates and timeline to link the relevant topics together (Box 995). The data in Boxes 990 and 995 are further utilized to infer and extract more knowledge from the Causality Graph in Box 100. Box 100 presents the new augmentation content that will be added to the causality graph. At the end of this process, a rich set of local and global augmentation along with a knowledge graph with a timeline that connect the different topics (local and global) and the mined relationships and properties will be available.

A block diagram of an Augmentation System 100 is shown in FIG. 1. A Reference Content 105 corresponds to any electronic document or web page that a user wants to invoke the Augmentation System 100 to get Augmented Content 190. The Reference Content 105 can be stored locally in a memory subsystem of an electronic device, a memory subsystem of a display screen device, or is accessed from a remote location via a wired or wireless communication system. The communication system could use the internet, a cloud, a data store, a computing device, server or a database via a wired or wireless networking link. The augmented content is a generated content by the Augmentation System 100 based on the Reference Content 105 using a set of features, filters, and categories which are produced by at least one of an Extract Features 120, Extract Categories 125, and Update Categories 137 subsystems as shown in FIG. 1.

A Local Content 110 is a selected portion of the Reference Content 105 which the user wishes to get more specific augmentation about, or that is a portion of the Reference Content 105 that the user is interacting with. Furthermore, the Local Content 110 may also be automatically selected, tagged, managed, or generated by the Augmentation System 100, e.g. based on a displayed portion of the Reference Content 105 or a user interaction with a portion of the Reference Content 105. Furthermore, the presentation and/or the displaying of the Augmented Content 190 is managed using Manage RAC 145 (RAC refers to Relevant Augmented Content) to control a Display Queue 165 and Display RAC 170.

The Augmentation System 100 generates Augmented Content 190 by facilitating the construction of a user-customized network of concepts, objects and relationships that serve to augment the Reference Content 105 at hand for the purpose of knowledge discovery, learning, and a richer user experience in browsing and/or interacting with data information. This Augmentation System 100 generates any one of a network of concepts, a network of objects, and a network of relationships using one or more of a set of features, a set of filters, and a set of categories. Each of the set of features, the set of filters, and the set of categories can be customized and tailored based on the user's interests and input. The constructed network can be saved and further augmented over time for richer and more efficient user experience.

The Extract Features 120 subsystem extracts a set of features from the Reference Content 105. General Features 117 can provide a set of features that can be updated and tailored overtime to at least one of a specific user, specific project, specific objective, and specific subject. Extract Features 120 generates a set of filters that denotes the desired concepts for augmentation. For example, these concepts could be names of people, history, events, topics, or other meta-data. These data are either computed on the fly or pre-computed and stored locally or remotely for current or subsequent augmentation sessions. This extraction process is based on embedded data in at least one of the Reference Content 105, in a linked content to the Reference Content 105, metadata of the Reference Content 105, e.g. a title of the Reference Content 105, linked content to the Local Content 110, and semantic information that are either associated with the Reference Content 105 or that can be extracted/aggregated from the Reference Content 105. Other data that can be extracted or inferred can be further used for constructing a more meaningful feature set by utilizing a variety of information retrieval, extraction, and inference algorithms and methods. There is large body of work on feature extraction that utilizes the cloud as well as other large-scale solutions. These approaches can be leveraged by the Extract Features 120 along with flexible and efficient algorithms to generate a feature set on the fly based on the metrics and signatures mentioned earlier. Furthermore, any part of the Augmentation System 100 can be run remotely on a server or in the clouds, or it can be run locally on the host device.

The Extract Categories 125 function uses a set of categories or topics that are extracted based on the data that can be associated or extracted from the Reference Content 105. This data can be either meta-data or any other related data to the Reference Content 105. The Extract Categories 125 extracts a set of categories from the Reference Content 105 and its associated links and data. Also, the system utilizes any embedded categories or meta-data that are either embedded in the link or attached to the Reference Content 105. The extracted categories can also describe meta-data about the topic at hand. For example, if the reference content is an article about AIDS, there are many categories that can augment data about AIDS. For example, a set of categories can be: History of AIDS, Science of AIDS, Social Impact of AIDS, Symptoms of AIDS, etc. . . . . A user may only be interested in the science of AIDS, so a user will interact with the presented categories, e.g. by deselecting all categories that are not related to science, and this will impact the set of features that are used in augmenting the Reference Content 105. Other data that can be extracted or inferred can be further used for constructing a more meaningful category set by utilizing a variety of information retrieval, extraction, and inference algorithms and methods. In addition, a General Categories 115, as shown in FIG. 1, is a set of default categories that the Update Categories 137 processes to reflect the user's interests. For example, the General Categories 115 can be Business, Politics, Education, Research, Health, Technology, etc. . . . . The Update Categories 137 may use this optional input from the user to bias the augmentation to the categories of interest. This optional input can be stored and updated over time.

The interaction of a user with the Augmented Content 190 may be accomplished in a variety of ways. For example, the user may select one or more of the presented categories for removal, selection, decreasing priority, and increasing priority. The user may also define, modify, or interact with an association rule to aid Extract Features 120 to generate a more useful set of filters for better augmented content. The association rule can leverage, use, or joins one or more categories, features, filters, or concepts to (i) generate a new set of features, filters, categories, or Augmented Content 190, and (ii) to modify one or more of the set of features, filters, or categories which are being used to generate the Augmented Content 190. Based on the General Categories 115 and user's interaction, further categorization and feature extraction will be biased towards the user's interaction or input. This is an optional input that is used to customize the Augmented Content 190 based on a user's needs, the user's interaction with Augmented Content 190, or to aid the Augmentation System 100 to provide more relevant Augmented Content 190 for a specific purpose. Upon a user's interaction with the Augmented Content 190, an Update 130 function enables the user's input to be considered by Update Categories 137, e.g. a user may choose to delete some of the default/general categories that are not of interest or to elevate the priorities of some of those categories. When deleting categories, the Update Categories 137 will reduce the weight of the features that are related to those categories. When categories are elevated in priority, the Update Categories 137 increases the weight given to those features that are related to those categories. Thus, affecting and updating the Augmented Content 190 presented to the user.

An Update Filters 150 is used to indicate a user's preference for a feature or automatic feedback based on user's interaction with the Augmented Content 190. For example, when one or more of the Reference Content 105, Local Content 110, and Augmented Content 190 get updated or interacted with by a user, then more clues and feedback can be gathered from the updated list or the user's interaction as to revise the features and categories that are of interest to the user in real time. However, the user may choose not to update the features and categories, and the Augmentation System 100 provides the user the ability to control how and when the Augmented Content 190 is generated and/or updated.

An Update Features & Categories 135 subsystem receives a first set of features from the Extract Features 120 subsystem, a first set of categories from the Extract Categories 125, and/or an updated set of categories from the Update Categories 137, and/or an Update Filters 150. Update Features & Categories 135 manages and controls the updating of the actual features and categories sets including any decision making based on the user input or interaction. The Update Features & Categories 135 may communicate with any one of Extract Features 120, Extract Categories 125, and Update Categories 137 to generate more features and categories based on a variety of parameters including the user's preferences. Furthermore, Update Features & Categories 135 also handles updating relationships and cleaning up for those features and categories that were updated by the user.

A Compile RAC 140 subsystem receives a set categories and a set features from the Update Features & Categories 135 subsystem. Compile RAC 140 includes a variety of functions and algorithms such as machine-learning, data mining and extraction, web crawling, data-mart accessing, extraction and processing functions, and other intelligent algorithms and approaches are used to compile a set of relevant augmented content or pages (RACs) based on at least one of the Reference Content 105, Local Content 110, and the interest of the user. Managed RAC 145 subsystem is the controller that manages the presentation of the Augmented Content 190 via a Display Queue 165 and Display RAC 170. The Augmentation System 100 listens to inputs from the user and manages the generation of the Augmented Content 190. The Managed RAC 145 subsystem generates three outputs taking into consideration a user's feedback or input. The Managed RAC 145 subsystem generates and controls the communication of the generated Augmented Content 190 using Display Queue 165 and Display RAC 170. In addition, Managed RAC 145 generates an update request to Update RAC 155 for any necessary update to the Display Queue 165 based on a user's interaction or input. The Display Queue 165 displays in a desired skin at least a portion of the queue of RACs so that the user can browse through them and select some to view. The Display Queue 165 displays a link, a summary, or a portion of the compiled relevant content or pages. Upon selection or interaction by a user with one of the displayed RACs, the Display RAC 170 retrieves the respective relevant page RAC and displays at least a portion of it. The Display RAC 170 subsystem manages and controls the displaying of the Augmented Content 190 using the display screen. Display RAC 170 can use one or more display layers on top of the Reference Content 105 or Local Content 110 via translucent display layers as discussed in previous paragraphs.

A block diagram of a Hierarchical Augmentation System 200 is shown in FIG. 2. This hierarchical augmentation or nested augmentation capability enables a user to augment any content that is the result of data augmentation at any level of browsing or exploration. For example, given that the Augmentation System 210 generates a list of RACs, the user may select any one of the RACs or a group of RACs to invoke the augmentation system on and to generate another level of augmentation. The Augmentation System 200 allows the user to go back and forth in the hierarchical graph to browse any particular content at any level, be it a reference or augmented content. For example, the Augmentation System 200 provides augmented content at Process 1 220, which is the first invocation of the augmentation system on reference content, a user may elect to augment one or more of the augmented content of Process 1 220. The Augmentation System 200 uses the elected content to be augmented from Process 1 220 as an input or reference content to Process 2 230 for augmentation. Process 2 230, which is considered the second invocation of the augmentation system on a reference content, generates in turn augmented content which the user can further refine or interact with, and so on for Process K 340, Process (n–1) 350, and Process (n) 360. Multilevel nesting or hierarchical augmentation is not limited to a specific number of levels. Of course certain hardware or software limitations or a particular application may dictate the use of a specific number of levels. However, this is an option that can be used to various extents as part of the customization of Augmentation System 200 for any particular usage.

A block diagram of a Hierarchical Augmentation System 300 is shown in FIG. 3. This hierarchical augmentation or nested augmentation capability comprises the same capabilities as the Hierarchical Augmentation System 200 is shown in FIG. 2 and includes an Augmentation System Control 390 subsystem that is communicating Augmented and Reference contents AR-325, AR-335, AR-345, AR355, and AR-365 with Process 1 320, Process 2 330, Process K 340, Process (n–1) 350, and Process (n) 360, respectively. As described above Process 1 320 corresponds to a first level instance of Augmented System 100, and Process (n) corresponds to an n-th level instance of Augmented System 100. Given that each of the nested augmented systems may generate different augmentation content for each hierarchical level at least due to variations in user input or the reference content corresponding to the hierarchical level, the Augmentation System Control 390 may receive one or more of the generated augmented content of each hierarchical level, a copy of the set of filters, a copy of the set of features, and a copy of the set of categories. The Augmentation System Control 390 can further run sophisticated statistics, analytics and algorithms to extract new features or generate new filters or categories. Furthermore, the Augmentation System Control 390 may receive user input to control what type of analysis or augmentation the user expects the Hierarchical Augmentation System 300 to provide or keep track of nested contents that the user is interacting with, viewing, or manipulating at various levels of hierarchy.

A block diagram of an Augmentation System 400 using a Display Control 420 subsystem is shown in FIG. 4. The Augmentation System 410 is essentially the same as any one of the Augmentation System 100, Augmentation System 200 and Augmentation System 300 as shown in FIG. 1, FIG. 2, and FIG. 3 respectively. The Display Control 420 subsystem controls the displaying of various elements such as Augmented Content 450 and Reference Content 440, which are output of the Augmentation System 410. In addition, the Display Control 420 receives input control from Augmentation Display 430 subsystem and/or from a user interacting with the Augmentation Display 430 or one or more display layers displayed using the Augmentation Display 430. Based on the Augmented Content 450 generated from Augmentation System 410, Display Control 420 generates and/or controls different display layers, widgets, icons, and other knobs which are utilized to show, control, or manipulate any one of the Augmented Content 450 and Reference Content 440. Furthermore, Display Control 420 provides means for the user to interact with any one of the Reference Content 440 or the Augmented Content 450.

In accordance with one embodiment, the Augmentation System 410, the Display Control 420, and Augmentation Display 430 are elements of the same physical electronic system such as a mobile device. The user can manipulate any one of the Augmented Content 450, Reference Content 440, and how each is displayed onto the Augmentation Display 430. In addition, a user interface (UI) may be used to further aid the user to manipulate or interact with any one of the Reference Content 440 and the Augmented Content 450 and the displaying of such content. Furthermore, the UI can provide an easy mechanism for a user to interact with the categories, widgets, buttons, and any other option that is presented for the user to engage with the Augmentation System 410.

In accordance with one embodiment, the Augmentation System 410, and the Display Control 420 are elements of a first electronic device that is separate from a second electronic device comprising the Augmentation Display 430, wherein the first and second electronic devices communicate the Reference Content 440 and the Augmented Content 450 back and forth based on the Augmentation System 410 and/or a user interaction with any one of Reference Content 440 and Augmented Content 450.

In accordance with one embodiment, the Augmentation Display 430, and the Display Control 420 are elements of a first electronic device that is separate from a second electronic device comprising the Augmentation System 410, wherein the first and second electronic devices communicate the Reference Content 440 and the Augmented Content 450 back and forth based on the Augmentation System 410 and/or a user interaction with any one of Reference Content 440 and Augmented Content 450.

In accordance with one embodiment, a system for extraction and generation of features and categories Extract Relevant Features 500 is shown in FIG. 5. The Extract Relevant Features 500 is tasked with building a set of features and categories that any one of the Augmentation System 100, Augmentation System 200, Augmentation System 300 and Augmentation System 400) can utilize to generate augmented content. Reference Content 510 is similar to Reference Content 105, and Local Content 520 is similar to Local Content 110. Categories 530 is a subsystem which is responsible for constructing a list of categories that captures or is responsive to the user's inputs and preferences, a set of extracted categories from Reference Content 510 and Local Content 520, and a set of customized categories associated with the user. Features and Metrics 525 is a subsystem which generates a set of features, a set of signatures, and/or a set of metrics each of which is either dynamically generated or pre-computed and stored. Features and Metrics 525 delivers these sets of features to an Extract Features 540 subsystem. In addition, the Extract Features 540 receives input from Reference Content 510, Local Content 520, Features and Metrics 525, and Categories 530. Extract Features 540 delivers a set of features, a set of signatures, and a set of metrics to Compile RACs 550 subsystem, which in turn utilizes one or more of those sets to compile from the internet, a local data store, or any other data repository (public or private) a set of data elements. A Relevant Augmented Content 560 subsystem receives the set of data elements and/or the set of features, the set of signatures, and the set of metrics to generate a customized augmented content for the user.

In accordance with one embodiment, a simplified block diagram of a system for extraction and generation of features and categories Extract Relevant Features 600 is shown in FIG. 6. The Extract Relevant Features 600 can be used as a part of an augmentation system such as Augmentation System 100, Augmentation System 200, Augmentation System 300 and Augmentation System 400 each of which has been described above. The Extract Relevant Features 600 is utilized to compile a set of features, using Compile RAC 650, to be used by an augmentation system to generate augmented content. Extract Candidate 618 processes at least a portion of a Reference Content 608, and receives other user-provided input to extract or generate one or more set of filters and features. Features 620 uses the one or more set of filters and features to organize, build, compile or store a user-customized network of features, concepts, objects and their relationships. Features 620 serve to provide a better extraction or a focused extraction of a user's relevant set of features that can provide a faster convergence on what the user is interested to see or would want to see regarding the Reference Content 608. In addition, this provides a better value add augmented content for the purpose of knowledge discovery, learning, and a richer user experience in browsing and/or interacting with data information. Furthermore, Features 620 can learn, save and further refine the user-customized network of features, concepts, objects and their relationships over time for richer and more efficient user experience. Similarly, Categories 630 uses the one or more set of filters and features generated by Extract Candidate 618 to organize, build, compile or store a user-customized network of categories and their relationships. Categories 630 can learn, save and further refine the user-customized network of categories and their relationships over time for richer and more efficient user experience.

Metrics 640 is a system that can provide user influenced metrics information to Compile RAC 650. Metrics 640 uses the one or more set of filters and features generated by Extract Candidate 618 to organize, build, compile or store a user-customized network of metrics which can be user defined or system's default. For example, Metrics 640 can use date or time as a metric that can be used to further narrow and focus on the relevance of the augmented content to the user or to the Reference Content 608. Another example is to use a source or a group of sources to aid Compile RAC 650 to limit or expand its compilation and generation of relevant augmented content. Metrics 640 can learn, save and further refine the user-customized network of metrics and their relationships over time for richer and more efficient user experience. Metrics 640 can receive real time information from the user or other part of an augmentation system, and provides an update in real time to Compile RAC 650.

Compile RAC 650 is used to compile the networks of features, categories and metrics received from Features 620, Categories 630, and Metrics 640 to generate and prioritize a focused set of relevant augmented content (RAC) that captures the properties and/or attributes of Reference Content 608 and reflects the user's rules, interests, preferences, and attributes. This focused set of relevant augmented content (RAC) is to be used by an augmentation system to deliver or present a concise and highly relevant augmented content to the user. Compile RAC 650 is used to resolve any conflicts that may exist between any of the networks of features, categories and metrics. Compile RAC 650 also provides and determines the priority of the final list of RACs to be delivered or presented to the user. Compile RAC 650 can also receive, generate or modify an association rule which can be used to leverage, or join one or more categories, features, filters, concepts, or metrics to (i) generate a new set of features, filters, categories, or relevant augmented content, and (ii) modify one or more of the set of features, filters, or categories which are being used to generate the relevant augmented content.

In accordance with one embodiment, an augmentation system can use Display Layers and Controls 700 as shown in FIG. 7 to display the generated Augmented Content 760, Global Augmented Content Queue 720, Global Augmented Content Queue 770, and the Reference Content 750. For example, this can be one instantiation of the data presentation mechanism of an augmentation system as described above, e.g. Augmentation System 100. The user can change the look and feel (skin) of the Display Layers and Controls 700 using any number of skins (look and feel options). The Global Augmented Content Queue 720 corresponds to a displayed part of a relevant augmented content (RAC) generated by the augmentation system. The user can browse and scroll through this queue to select a relevant augmented content of interest. Local Augmented Content Queue 770 refers to the relevant augmentation results that are related to the part of Reference Content 750 that the user has interacted with or is being displayed via Display Screen 710, and which is referred to as Local Content. Display Layers and Controls 700 can manage the display of the Global Augmented Content Queue 720 and Local Augmented Content Queue 770 in various ways, such as the location of the display of the queues as well as the portion of any one of the queues that is being displayed using Display Screen 710. For example, the user can choose that only the Global Augmented Content Queue 720 is displayed, thus Display Layers and Controls 700 will manage to display the portion of RACs of the Global Augmented Content Queue 720 that may be accommodated onto the Display Screen 710. Similarly, the user may choose to emphasize the Local Augmented Content Queue 720 and thus the Display Layers and Controls 700 will manage that as well. The Reference Content 750 refers to the content being browsed and explored for further augmentation. Display Screen 710 corresponds to a display screen that may be physically collocated within the same device where the augmentation system is being used, or it can be part of a separate electronic device. Augmented Content 760 is displayed using one or more display layers, and is the augmentation content that the user chooses to view. An icon Promote 740 is used to highlight, select, or promote a specific RAC. Promote 740 provides a mechanism for the user to interact with any of the RACs of Global Augmented Content Queue 720 and Local Augmented Content 770 by elevating the priorities of a RACs. Similarly, a demote icon (not shown) can be used by the user to remove or dismiss a RAC or a group of RACs entirely if the user is not interested in them.

A Simulated Display 800 is a use case scenario of the Display Layers and Controls 700 and any one of the augmentation systems described earlier as shown in FIG. 8. This Simulated Display 800 presents an example of a user reading an article about AIDS as shown in Reference Content 810. The user then invokes the Augmentation System to augment Reference Content 810. Based on the categories presented to the user, the user selects categories that are related to AIDS Research and Science. Categories Related to AIDS RACs 820 shows part of the global augmentation deep queue that the system generated in response to the user's interest in AIDS, Science, and Research.

A Simulated Display 900 is a use case scenario of the Display Layers and Controls 700 and any one of the augmentation systems described earlier as shown in FIG. 9. This Simulated Display 900 presents an example of a user reading an article about AIDS as shown in Reference Content 910. Selected Content 920 shows an example of selecting part of the Reference Content 910. The user then invokes the Augmentation System to augment Reference Content 910 and Selected Content 920. Based on the user's choice of categories related to Science and Research of AIDS, and the system's extracted categories and features RACs 905 shows part of the global augmentation deep queue that the system generated. Africa/India AIDS RACs 930 shows part of the local augmentation deep queue that the Augmentation System generates in response to the user's selection of part of Reference Content 910. Augmented Display Layer 940 is an example of displaying of Africa/India AIDS RACs 930. Augmented Display Layer 940 shows a RAC (HIV and AIDS) in the local augmentation queue that the elected to view.

New Work on Augmentation and Knowledge Discovery. Build on previous work of data augmentation and knowledge discovery. Tap into existing ontologies. Utilized known, constructed, and synthesized Discovery Patterns to improve the performance of the system for online discovery and mining. General Ontologies are bulky and inefficient to mine. It is best the system does that only if Discovery Patterns are not available to reduce the search space.

Mission: Provide an on-demand friendly and rich mobile knowledge discovery platform that makes context-sensitive remote and hidden relevant knowledge and information accessible and useful. We will seamlessly and intuitively bring knowledge to every one.

Knowledge Discovery: The Next Revolution. Ongoing Progress to help users find information relevant to their immediate goals by improving search and document classification. A huge gap between the way most systems organize information and the way humans wish to access that information. Search views information as sequences of words or numbers with no deep interrelationships, while humans meaning conveyed by words. Humans explore ideas and concepts, while automated systems are limited to searching for words.

Knowledge Discovery Framework; Knowledge Discovery in Web Content; Relevant Topics Mining; Relevant Latent Topics Discovered; Relevant Queries Mining; Hierarchical Topics Graph, Discovery of intermediate topics to discover/expose relationship between related topics; Causality Graph Construction and Mining. New figures are added to utilize Discovery Patterns, Synthesize Causality Graph, and mining of Causality Graph and other available repositories for a richer knowledge discovery experience. Not everything is available in causality graph and further online mining for more augmentation data might be needed.

Name Entity Relationship: Named Entity Recognition (NER) is a key for accurate content extraction for knowledge discovery. Personal names, places, dates, organizations, groups, parties and other named entities (NEs) to characterize topics in a document; Name Disambiguation; Name phrase parsing, compound names, . . . ; Known concepts, events, . . . .

Possible Product & Service Offerings: Knowledge Discovery platform that aids in any product or service where data augmentation and knowledge discovery are desired or suitable. Examples: News discovery, Political, Business, Historical, Science, . . . ; Browsing & research; Financial Data Discovery; Company profile, competitive assessment, etc. . . . ; eHealth Discovery; By leveraging a health-related DP; Medication Information, Patient Case Analysis, Prognosis and other related Data can be discovered and displayed.

Discovery Patterns (DP): Pre-defined DP; Custom-tailored DP; On the fly synthesis of DP; Mapping info extracted from document/page to DP: Mining Web for CQ (Competitive Questions); Extracting Relevant/latent Topics; Discover hidden and or nonobvious topics & relationships; Filling DP based on user's preferences/interests.

Custom built DP: Fluid DP Synthesis: Tapping into user's selected categories and topics, a DP can be synthesized. DP is fluid and will change over time based on user's preferences/interests. DP can be synthesized and tailored based on existing public information repositories (Freebase, dbpedia, Quora, . . . and private knowledge (if accessible).

Library of DP: Build a pre-defined set of topic-relevant DPs; Synthesize a library of DPs based on selected categories and relevant topics. Library will store all existing and new DPs for future processing. If on-the-fly synthesis causes performance problems.

Causality Graph for KD: Causality graph (CG) is vital for discovering hidden topics that are important to connecting known topics. Hidden topics discovered by CG are vital to discovering other important relevant topics. In particular, when a feature set of the reference topics (topics, categories, user feedback) and its relevant topics can not discover important topics for further knowledge discovery, mined hidden topics can be the answer. Hidden topics go beyond topics defined by the words or phrases or known relationships of reference topics.

Competency Queries: Competency questions/queries (CQ) aid in seeding a set of interesting questions to answer about the reference topic or the relevant topics that can be extracted. CQ are also important to seed a discovery template to augment the topic at hand.

Competency Queries Extraction/Mining: CQ can be manually crafted by the user/system. CQ can be automatically extracted or synthesized. For example, the knowledge discovery and augmentation system can query databases for questions relevant to topic and select the highest ranked questions that history shows people care about. Quora is an example of such database that can be mined to extract a set of CQ for a topic. In an enterprise setting, to mine a set of CQ about a product, customer's feedback/queries/marketing data can be mined to synthesize a set of CQ relevant for a product. This CQ will serve as a seed to craft a Discovery Pattern that will serve in augmentation of the relevant topic.

Causality Relationships: Relationships Characterizing; causing and leading relationships can be constructed based on mining a causality graph that is constructed beforehand. Involved Relationship: Same actors involved in different topics in same timeline.

Topic Relationships: Topic Relationship Model is a mapping R such that T1 R T2: Discovered topics and docs that connect T1 and T2; R completes the knowledge graph that is relevant to the reference content. Example: Topics, Entities, Categories.

I claim:

1. A smart knowledge discovery and augmentation system, comprising:
   an electronic device having a display screen operable to display a portion of a reference document using a first display layer and augmented content using a second display layer, the electronic device operable
   (i) to allow user interaction with the portion of the reference document for selection of a reference topic to be augmented, and
   (ii) to communicate with a remote server,
   wherein the reference document includes digital data information stored locally on the electronic device or via the remote server; and
   a ranking engine configured to prune out a portion of a set of features extracted from the reference document,
   wherein the augmented content is generated using a set of discovery patterns and a causality graph,
   wherein the set of discovery patterns is dynamically generated based on context aware competency questions relevant to content of the reference document, and
   wherein the causality graph is generated using (i) a set of prior topics that are relevant to content of the reference document, (ii) the reference topic to be augmented, (iii) a set of at least two causal relationships, (iv) a set of actors relevant to the set of at least two causal relationships, (v) a set of topics and a set of categories associated with the set of topics, and (vi) the set of discovery patterns.

2. The smart knowledge discovery and augmentation system of claim 1, wherein both the set of topics and the set of categories associated with the set of topics are used to determine a correct causal relationship amongst the set of at least two causal relationships.

3. The smart knowledge discovery and augmentation system of claim 1, wherein the context aware competency questions for topics relevant to content of the reference document define a set of queries related to the reference document.

4. The smart knowledge discovery and augmentation system of claim 1, wherein the context aware competency questions for topics relevant to content of the reference document define a set of queries related to relevant topics that can be extracted from the reference document.

5. The smart knowledge discovery and augmentation system of claim 1, wherein the set of actors relevant to the set of at least two causal relationships include at least one of a named entity, a location, and an organization.

6. The smart knowledge discovery and augmentation system of claim 1, wherein the user interaction with the portion of the reference document includes at least one of a manipulation of a region of the first display layer, and a manipulation of a region of the second display layer.

7. The smart knowledge discovery and augmentation system of claim 1, wherein the user interaction with the portion of the reference document includes hiding of the first display layer, hiding of the second display layer, modifying the translucency of the second display layer, or a selection of a region of the display screen.

8. The smart knowledge discovery and augmentation system of claim 1, wherein the user interaction with the portion of the reference document includes saving the augmented content or saving a portion of the augmented content locally on the electronic device or via the remote server.

9. The smart knowledge discovery and augmentation system of claim 1, wherein the display screen is physically separate from the electronic device.

10. The smart knowledge discovery and augmentation system of claim 1, wherein the display screen can communicate with another electronic device.

11. The smart knowledge discovery and augmentation system of claim 1, wherein a human interface device is used to communicate the user interaction with the portion of the reference document to the electronic device.

12. An augmentation system, comprising:
   an electronic device having a display screen operable to display a portion of a reference document using a first display layer and augmented content using a second display layer, the electronic device operable (i) to allow user interaction with the portion of the reference document for selection of a reference topic to be augmented, and (ii) to communicate with a remote server,
   wherein the reference document includes digital data information stored locally on the electronic device or via the remote server,
   wherein the augmented content is generated using a set of features extracted from the reference document, a set of discovery patterns and a causality graph,
   wherein the set of discovery patterns is dynamically generated based on context aware competency questions relevant to content of the reference document and
   a ranking engine configured to prune out a portion of the set of features extracted from the reference document,
   wherein the causality graph is generated using (i) a set of prior topics that are relevant to content of the reference document, (ii) the reference topic to be augmented, (iii) a set of at least two causal relationships, (iv) a set of actors relevant to the set of at least two causal relationships, (v) a set of topics and a set of categories associated with the set of topics, and (vi) the set of discovery patterns, and wherein at least a portion of the causality graph is updated using a timeline.

13. The augmentation system of claim 12, wherein the set of features extracted from the reference document corresponds to a set of signatures of the reference document.

14. The augmentation system of claim 12, wherein the set of discovery patterns include user-provided discovery patterns.

15. The augmentation system of claim 12, wherein the timeline is generated by processing relevant documents in public or private repositories.

16. The augmentation system of claim 12, wherein the augmented content include a set of local augmentation and a set of global augmentation.

17. The augmentation system of claim 16, wherein the augmented content include a knowledge graph with the timeline, the knowledge graph connects topics of the set of local augmentation or topics of the set of global augmentation using the timeline.

18. The smart knowledge discovery and augmentation system of claim 12, wherein the context aware competency questions for topics relevant to content of the reference document define a set of queries related to the reference document.

19. The smart knowledge discovery and augmentation system of claim 12, wherein the context aware competency questions for topics relevant to content of the reference document define a set of queries related to relevant topics that can be extracted from the reference document.

20. The smart knowledge discovery and augmentation system of claim 12, wherein the set of actors relevant to the set of at least two causal relationships include at least one of a named entity, a location, and an organization.

* * * * *